United States Patent
Hanson et al.

(10) Patent No.: US 7,483,986 B2
(45) Date of Patent: Jan. 27, 2009

(54) DYNAMICALLY TUNING NETWORKS OF RELATIONSHIPS IN SELF-ORGANIZING MULTI-AGENT SYSTEMS

(75) Inventors: James E. Hanson, Yorktown Heights, NY (US); Ian Nicholas Whalley, Pawling, NY (US)

(73) Assignee: International Business Machines Corporation, Armonk, NY (US)

( * ) Notice: Subject to any disclaimer, the term of this patent is extended or adjusted under 35 U.S.C. 154(b) by 846 days.

(21) Appl. No.: 10/726,724

(22) Filed: Dec. 3, 2003

(65) Prior Publication Data

US 2005/0125520 A1 Jun. 9, 2005

(51) Int. Cl.
*G06F 15/173* (2006.01)
(52) U.S. Cl. .................................... 709/226
(58) Field of Classification Search ................ 709/204, 709/223, 224, 225, 226
See application file for complete search history.

(56) References Cited

U.S. PATENT DOCUMENTS

| | | | | |
|---|---|---|---|---|
| 5,091,920 | A * | 2/1992 | Ikeda et al. ................ | 375/317 |
| 6,061,735 | A | 5/2000 | Rogers ...................... | 709/239 |
| 6,697,325 | B1 * | 2/2004 | Cain ......................... | 370/217 |
| 6,882,627 | B2 * | 4/2005 | Pieda et al. ................ | 370/248 |
| 7,013,395 | B1 * | 3/2006 | Swiler et al. ................ | 726/25 |
| 7,031,321 | B2 * | 4/2006 | Habetha ................ | 370/395.31 |
| 7,184,421 | B1 * | 2/2007 | Liu et al. .................... | 370/338 |
| 2003/0046583 | A1 * | 3/2003 | Goldman et al. ............ | 713/201 |
| 2004/0044891 | A1 * | 3/2004 | Hanzlik et al. .............. | 713/150 |
| 2004/0059812 | A1 * | 3/2004 | Assa .......................... | 709/224 |
| 2004/0081166 | A1 * | 4/2004 | Stanforth et al. ....... | 370/395.32 |
| 2004/0117624 | A1 * | 6/2004 | Brandt et al. ............... | 713/166 |
| 2004/0218582 | A1 * | 11/2004 | Kennedy et al. ............ | 370/351 |
| 2005/0080894 | A1 * | 4/2005 | Apostolopoulos et al. ... | 709/224 |

OTHER PUBLICATIONS

C. Bettstetter. On The Minimum Node Degree and Connectivity of a Wireless Multihop Network. Technische Universitat Munchen. MOBIHOC'02. Jun. 9-11, 2002.*
Réka Albert, Hawoong Jeong and Albert-László Barbási, Error and Attach Tolerance of Complex Networks, Nature: vol. 406, Jul. 27, 2000, pp. 378-381.
M. J. Keeling, The Effects of Local Spatial Structure on Epidemiological Invasions, The Royal Society, pp. 859-867.

* cited by examiner

*Primary Examiner*—Andrew Caldwell
*Assistant Examiner*—John M MacIlwinen
(74) *Attorney, Agent, or Firm*—Harrington & Smith PC

(57) ABSTRACT

In one aspect this invention provides a data processing system (10) that includes a plurality of self-organizing software agents (40) capable of autonomously establishing relationships between themselves, where the totality of the relationships can be represented by a topological structure having nodes that each contain one of the plurality of software agents and links between the nodes that are the established relationships. The data processing system further includes a topology tuning function that obtains information that is descriptive of the topology and, based at least in part on the obtained information and on at least one criterion, that makes a recommendation to at least one of the plurality of software agents that is intended to modify the topology. In one embodiment the topology tuning function is performed by a topology tuner software agent (20), while in another embodiment the topology tuning function forms a part of a system hosting function, such as a part of the operating system of the system (10).

49 Claims, 5 Drawing Sheets tion that determines the inter-relationships between agents. This level of self-organization is one of the defining features of multi-agent systems, and one of the most valuable.
DYNAMICALLY TUNING NETWORKS OF RELATIONSHIPS IN SELF-ORGANIZING MULTI-AGENT SYSTEMS

TECHNICAL FIELD

This invention relates generally to data processing systems and networks that include a plurality of autonomous software agents capable of self-organizing behavior resulting in the formation of inter-agent relationships and, more specifically, this invention relates to methods and apparatus for optimizing or tuning a topology of inter-agent relationships.

BACKGROUND

In multi-agent systems, agents form relationships among themselves according to their own internal preferences and decision-making logic. In general, there is no "dictator" function that determines the inter-relationships between agents. This level of self-organization is one of the defining features of multi-agent systems, and one of the most valuable.

Nevertheless, it is often desirable that the topology of the web of inter-agent relationships exhibit certain globally-defined properties. This is especially true if the multi-agent system is under the nominal administration of a single entity, such as a corporation, or was configured to solve some cooperative problem. For example, so-called "random" networks, such as the network of physical internet routers, in which the degree-distribution of nodes roughly follows a bell-curve, are relatively robust against targeted attacks on nodes, because the ill effects of the failure of any one node is approximately the same for all nodes. On the other hand, "scale-free" networks, in which the degree-distribution of nodes follows a power law, are relatively robust against random node failure, because most nodes are relatively unimportant to the overall network's functioning. Reference in this regard can be made to Albert, R., Jeong, H., and Barabasi, A.-L., "Error and attack tolerance in complex networks", Nature 406:378-381 (2000).

For the purposes of this patent application, a "scale-free network" is any network of relationships in which the degree-distribution of the nodes is characterized by a power law. The "degree" of a node denotes the number of connections a given node has with other nodes, i.e., the number of relationships (or relationships of a given type) that a given node is in. Thus, for scale-free networks, the histogram of node-degrees has the feature that relatively fewer nodes are found to have relatively higher degrees, with the overall relationship following a power-law curve.

It is also typically the case that the overall desired network topology can change with time. For example, during typical functioning it is desirable for the system to maintain robustness against random failure; but in the event of a real or an expected attack, it would be even more desirable for the system to instead protect itself against the attack. For this to occur the system should exhibit an ability to continually adjust the statistical properties of the network topology.

A problem thus exists in the prior art as to how to dynamically and intelligently modify, or alter, or "tune" the topology of the network of relationships in an operating multi-agent system, in order to achieve a desired global behavior, such as robustness against attack or against random failure, without overly restricting the ability of agents to autonomously form and break relationships.

There is a body of established work on the relationship between network topology and system robustness, especially the tradeoff between robustness against attack versus robustness against random failure, as was noted above. In addition, however, there exists relevant work on the relationship between the degree of inter-connectivity among nodes in a localized neighborhood, and the rate at which chain reactions of failures are propagated. Reference in this regard can be made to Keeling, M., "The effects of local spatial structure on epidemiological invasions", Proc. Roy. Soc. Lond. B 266, 859-869 (1999). This previous work indicates that changes to the topological structure of the network of relationships can have a profound effect on system dynamics, and in particular can result in improved system performance in the face of different kinds of failure or attack.

However, prior to this invention, there has been no description of a mechanism whereby these changes could be effected in the case of multi-agent systems.

There has also been extensive work on so-called "self-healing networks", in which elements of a network (e.g., internet or telecommunications routers) respond to failures of nodes by reconfiguring themselves in a distributed fashion. These approaches are sometimes proactive, in the sense that they attempt to prepare the system to optimally respond to failures in advance of the failure actually occurring. Reference in this regard can be made to U.S. Pat. No. 6,061,735: "Network restoration plan regeneration responsive to network topology changes", by James D. Rogers. However, this prior work does not address the need for systems to dynamically tune a preferred system topology to protect against different kinds of attack or failure, as the need arises.

SUMMARY OF THE PREFERRED EMBODIMENTS

The foregoing and other problems are overcome, and other advantages are realized, in accordance with the presently preferred embodiments of these teachings.

In one aspect this invention provides a data processing system that includes a plurality of self-organizing software agents capable of autonomously establishing relationships between themselves, where the totality of the relationships can be represented by a topological structure having nodes that each comprise one of the plurality of software agents and links between the nodes that comprise the established relationships. The data processing system further includes a topology tuning function that obtains information that is descriptive of the topology and, based at least in part on the obtained information and on at least one criterion, that makes one or more recommendations to at least one of the plurality of software agents that is intended to modify the topology. In one embodiment the topology tuning function is performed by a topology tuner software agent, while in another embodiment the topology tuning function forms a part of a system hosting function, such as a part of the operating system or other system software (e.g., an application server such as one known as the WebSphere™ Application Server that is available from the assignee of this patent application.)

In another aspect this invention provides, in a data processing system, a method to automatically tune a topology of relationships between a plurality of self-organizing agents. The method includes obtaining information that is descriptive of the topology and, based at least in part on the obtained information and on at least one criterion, making one or more recommendations to at least one of the plurality of agents that is intended to modify the topology of relationships between the plurality of self-organizing agents. This information may be obtained by the topology tuner agent by querying a system registry to determine identities of individual ones of the plurality of agents, and possibly also relationship information between the agents, and/or by querying individual ones of the plurality of agents to determine to which other agent or agents the individual one of the plurality of agents currently has a relationship.

In a further aspect this invention provides a topology tuner software agent operable in a data processing system that includes the plurality of self-organizing software agents. The topology tuner software agent includes computer program code for obtaining information that is descriptive of a topology of relationships between the self-organizing software agents from a system registry function or from the self-organizing software agents themselves; and also computer program code that is responsive to the obtained information and at least one criterion, for making at least one recommendation to at least one of the plurality of self-organizing software agents that is intended to modify the topology. Obtaining information can be performed periodically by topology tuner software agent to update the state of the topology, and the topology tuner software agent can make the recommendation when some topology threshold condition is satisfied.

In the various embodiments of this invention the at least one criterion may be a vulnerability of the topology to an attack directed to one or more of the self-organizing software agents, a vulnerability of the topology to a failure of one or more of the self-organizing software agents, and/or a rate at which the self-organizing software agents form new relationships.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
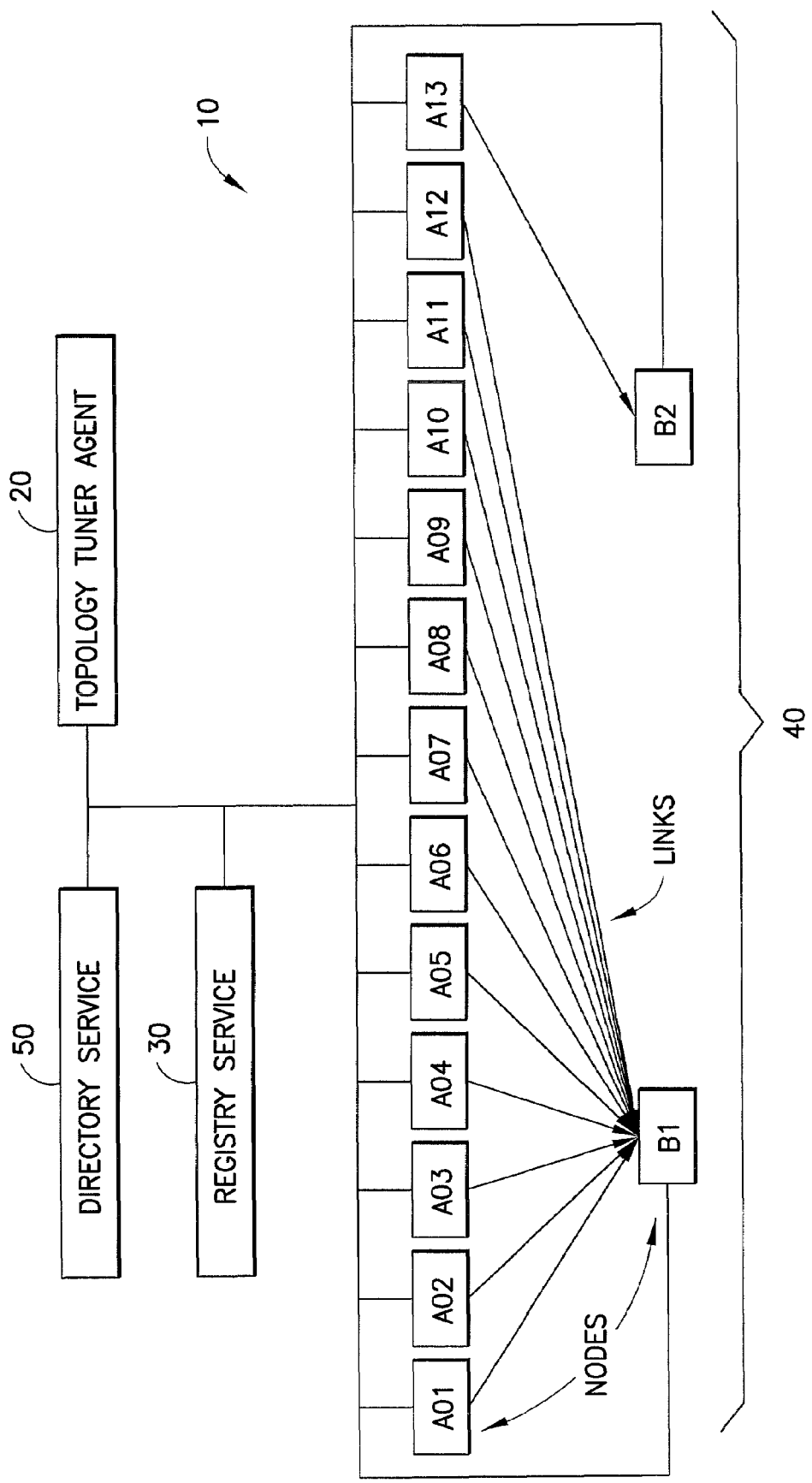
FIG. 1 is a simplified block diagram showing an unevenly-distributed topology of agent relationships, and a topology tuner agent in accordance with this invention.

FIG. 1 shows a multi-agent system 10 containing a topology tuner agent 20, a registry service 30, a directory service 50 and worker agents collectively referred to as agents 40, and designated individually as A01-A13, B1 and B2. All agents 40 are assumed to be registered with the registry service 30. The relationships between the worker agents 40 are indicated by the lines connecting the agents which, for the purposes of this invention, is considered to represent a topology of agent inter-relationships. In this non-limiting example A01-A12 are in a relationship with B1, which implies that the system 10 is extremely vulnerable to an attack directed against B1. As can be appreciated, the robustness of the system 10 to a targeted attack would be significantly increased if approximately half of the agents A01-A13 were in a relationship with B1, and the other half were in a relationship with B2. In accordance with this invention, the tuner agent 20 operates to detect this imbalance in agent relationships, and further operates to re-balance, or tune, the resulting agent relationship topology so as to reduce the vulnerability of the system 10 to failure or malicious attack.

Figure 2:
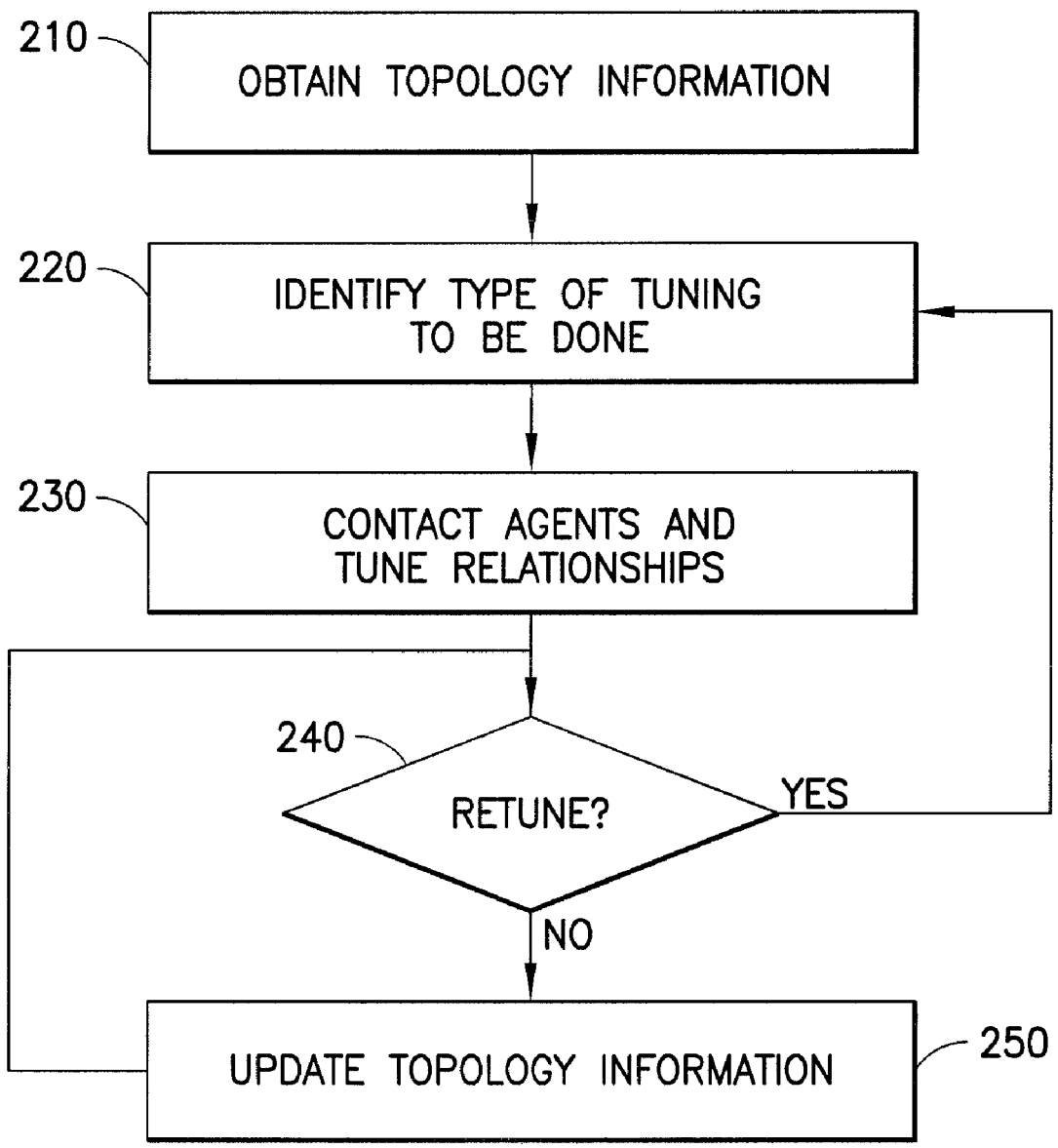
FIG. 2 is a logic flow diagram showing a tuner agent life cycle.
Figure 3:
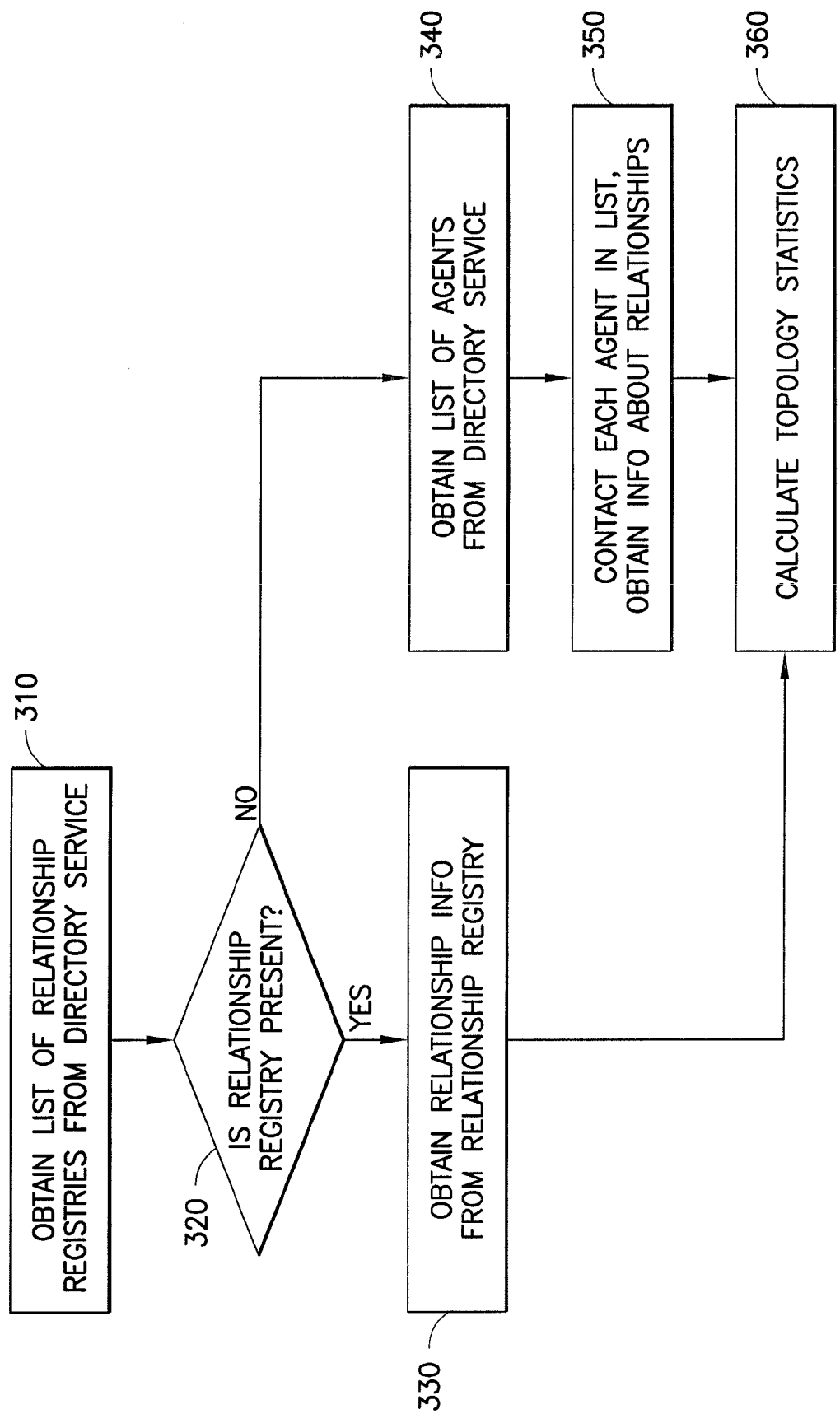
FIG. 3 is a logic flow diagram showing a process whereby the tuner agent gathers topology-related information.
Figure 4:
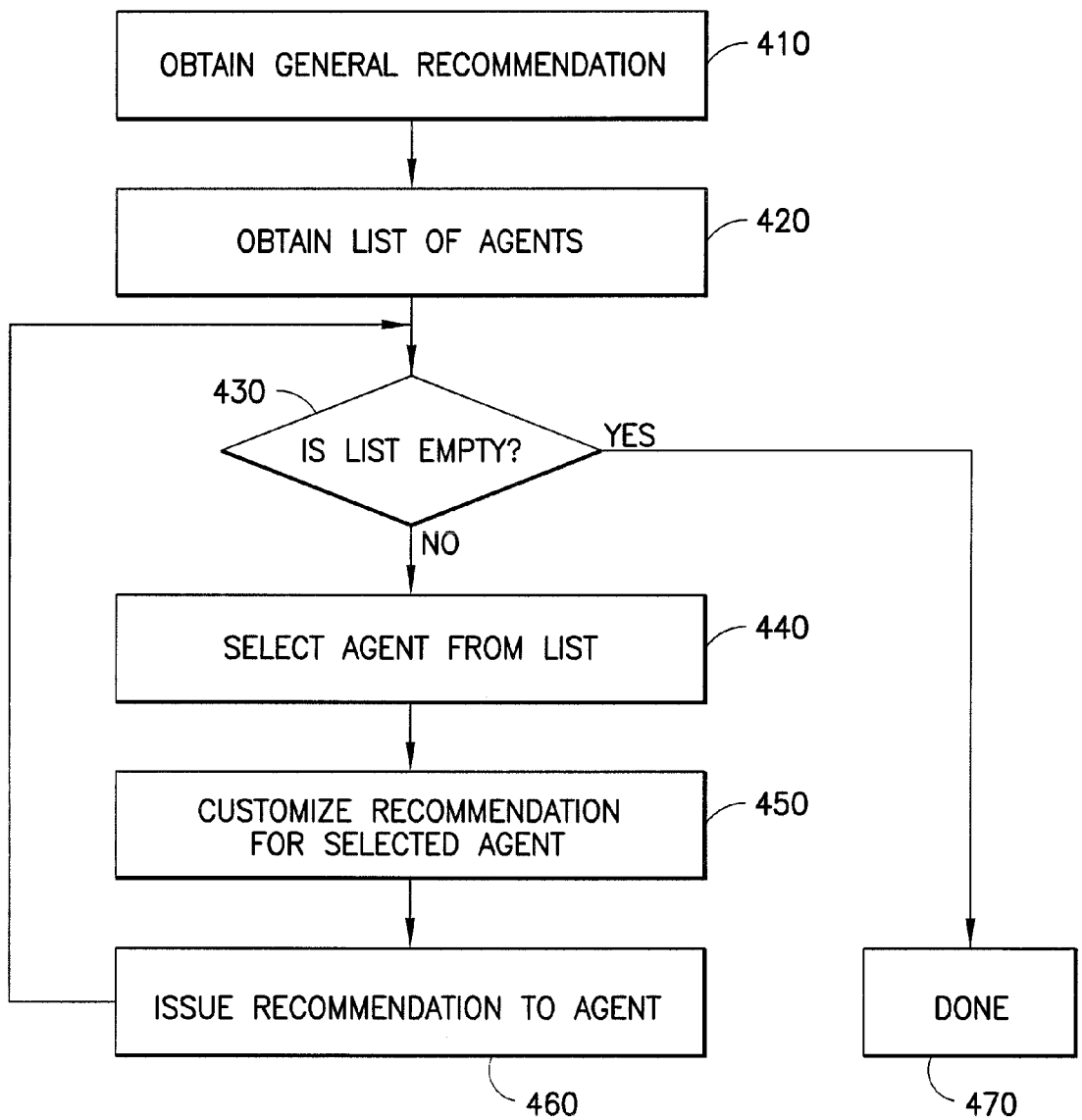
FIG. 4 is a logic flow diagram showing a process whereby the tuner agent tunes the unevenly-distributed topology of agent relationships.
Figure 5:
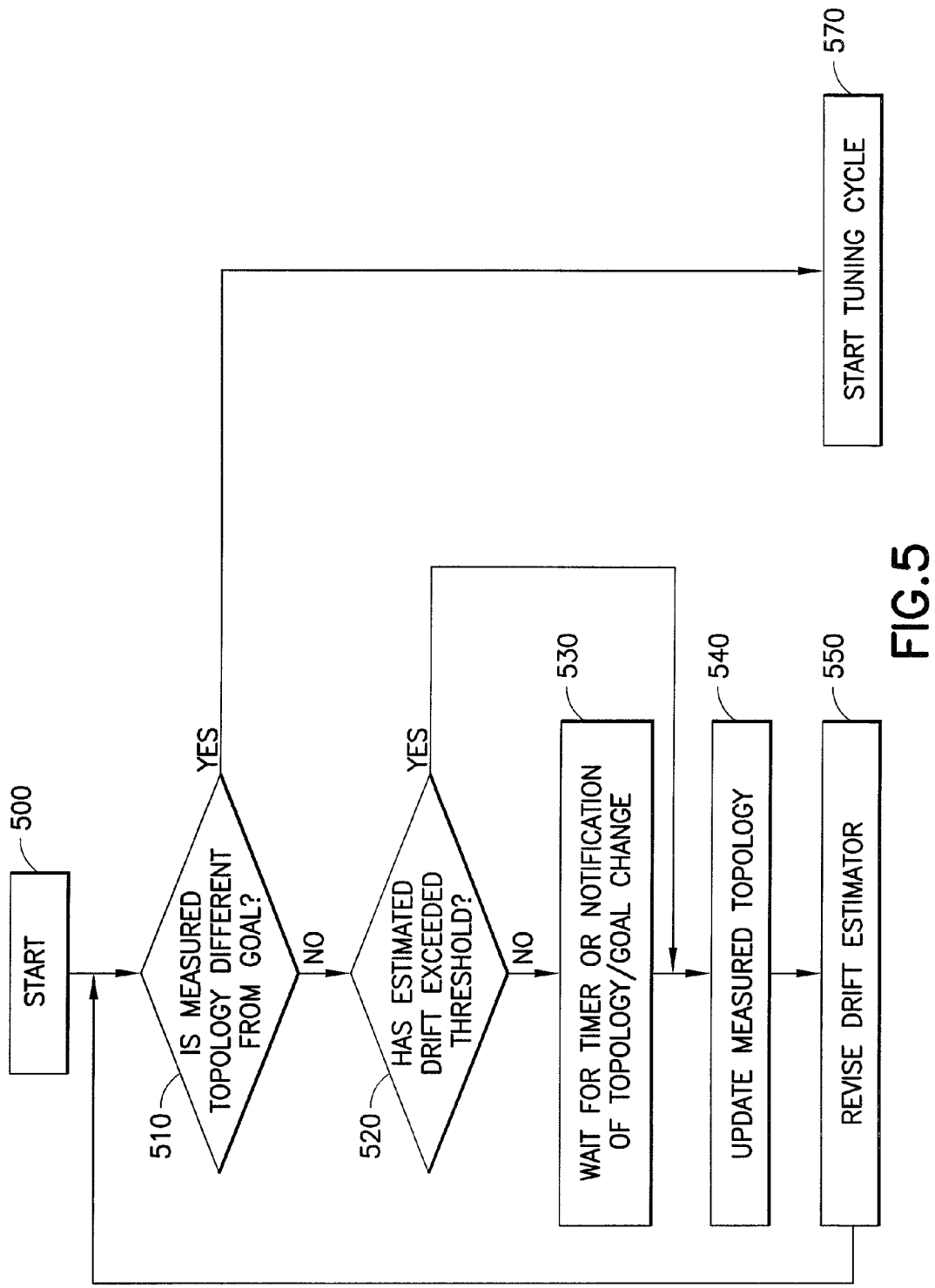
FIG. 5 is a logic flow diagram showing a process whereby the tuner agent determines when to begin another topology tuning cycle.

FIG. 2 shows the major steps in the life cycle of the topology tuner agent 20, while FIGS. 3-5 shows the operation of these major steps in greater detail.

Upon starting, at Block 210 the topology tuner agent 20 first obtains information about the current topology of relationships in the system 10. This may take the form of an exhaustive list of all relationships between agents 40 in the system 10, possibly labeled with identifiers to distinguish between different types of relationship. This information can be conveniently represented as a graph in which the agents 40 are nodes and relationships are arcs connecting nodes. Alternatively, the topology information may be represented by statistical measures of system topology, such as the distribution of the number relationships the agents 40 have. For example, the topology tuner agent 20 may construct a histogram of the number of relationships the agents 40 are in. In such a histogram, the ordinate or x-coordinate is the number of relationships, and the abscissa or y-coordinate gives the number of agents found to be in that number of relationships. To determine whether the system topology was more scale-free or random in character, the topology tuner agent 20 compares the shape of the histogram against two alternative representations, the Gaussian distribution and the power-law distribution, using conventional statistical curve-fitting techniques. The closer the histogram is to a Gaussian distribution, the more "random" is the topology, while histograms that resemble the power-law distribution indicate a scale-free topology. A preferred method of gathering this topology information is shown in FIG. 3, and is discussed below.

Having gathered the topology information, at Block 220 the topology tuner agent 20 determines what type of tuning should be performed. This may be accomplished by starting with a high-level policy or goal, such as might be set by a system administrator, and calculating characteristics of the desired topology, and then comparing those characteristics with the characteristics of the measured topology. For example, the system administrator might specify that robustness under random node failure is a goal. The topology tuner agent 20 takes this predetermined goal and identifies a desired topology that most closely matches the topology required to achieve the goal, in this example a random graph. This implies that the topology tuner agent 20 attempts to achieve a normal or Gaussian distribution of connections per node (i.e., per each agent 40).

It should be noted that the practice of this invention does not require a general purpose mapping between high-level goals and topological characteristics. It is sufficient for this invention to have the mapping be even so simple as a set of hand-coded rules that apply to different predefined goals.

Once it has determined the type of tuning to be done, at Block 230 the topology tuner agent 20 contacts at least some of the agents 40 in the system 10 and directs them to modify their relationships in a particular way. This can be done in a multi-cast fashion, in which the topology tuner agent 20 sends the same message to all agents 40 at once; or it may be done in a more individualized, single-cast fashion, in which the agents 40 are contacted one by one, and each one potentially receives a different recommendation from the topology tuner agent 20. FIG. 4 shows a preferred method of carrying out this procedure.

After completing a tuning process or cycle, the topology tuner agent 20 determines at Block 240 whether re-tuning is necessary. Re-tuning is necessary in general to deal with two kinds of change, both of which may occur at any time: (a) the desired topology may change in such a way that the current topology is no longer desirable, or (b) the actual topology may change in such a way that it no longer has the desired characteristics. The former may occur, for example, if the system administrator changes the primary goal from "stability under random failure" to "security against future targeted attack". The latter may occur, for example, because the agents 40 in the system 10 change their relationships, or due to a failure of one or more agents 40.

If the topology tuner agent 20 determines that re-tuning is necessary, control passes back to Block 220, otherwise the topology tuner agent 20 continues at Block 250 by monitoring the system topology and updating the topology information (possibly after a delay), and redetermining whether re-tuning is necessary. A preferred method of determining whether re-tuning is necessary and of updating the topology information is shown in FIG. 5.

FIG. 3 illustrates a preferred method whereby the topology tuner agent 20 gathers information about the topology of the system 10. First, the topology tuner agent 20 determines whether the topology information it needs is already available from another component in the system 10. A preferred technique for storing this information is by means of a "relationship registry". A relationship registry is an agent or service that keeps track of the relationships between the agents 40 in the system 10. Relationship registries have many uses beyond that of the tuning of relationships in accordance with this invention: for example, they are useful for certain methods of performing fast detection and diagnosis of problems in the system 10. For this reason, there is at least the possibility that the relationship information needed by the topology tuner agent 20 has already been gathered.

Therefore, in the preferred embodiment the topology tuner agent 20 contacts at Block 310 the directory service 50 and requests information about relationship registries in the system 10. If the directory service 50 returns the requested information at Block 320, the topology tuner agent 20 selects one or more of the registries (such as the Registry Service 30 shown in FIG. 1) and obtains at Block 330 the desired information about the topology of the relationships between the agents 40. If, however, there is no relationship registry service 30 present in the system 10, the topology tuner agent 20 instead directly gathers the topology information. This is preferably accomplished by obtaining at Block 340 a list of agents 40 to contact, and then at Block 350 contacting each agent 40 in the list and requesting from that agent the information that describes its relationships with other agents in the system 10.

After obtaining the topology information, either directly from the relationship register 30 or from the agents 40 themselves, the topology tuner agent 20 at Block 360 is enabled to calculate statistical measures of the system topology. For example, the topology tuner agent 20 may calculate the observed distribution in the number of relationships held by the agents 40. In the case where there are multiple types of relationships present in the system 10, the topology tuner agent 20 may calculate a distribution for each type of relationship.

In summary, FIG. 3 describes a presently preferred technique for gathering the topology information by the topology tuner agent 20. In general, as opposed to querying the individual agents 40 about their relationships, the topology tuner agent 20 may make use of the central registry 30 and/or the directory 50 in which information about the relationships of the agents 40 is stored. It is preferred that the registry 30 be kept up to date in some manner, such as by periodically receiving updates from the agents 40, or by periodically polling the agents 40.

There are various techniques for monitoring the topology of agent 40 relationships in the system 10. For example, the agents 40 may inform the topology tuner agent 20 whenever their relationships change; or the agents 40 may inform the relationship registry 30, which in turn informs the topology tuner agent 20, or the topology tuner agent 20 may poll the agents 40, or the relationship registry 30. Combinations of these techniques can be used as well.

FIG. 4 shows a presently preferred method whereby the topology tuner agent 20 performs the tuning the system 10 topology in a single operation. At Block 410 the topology tuner agent 20 obtains a general recommendation describing what type of tuning is to be preformed. An example of a general recommendation, which would be used to create a random graph, would be, "Re-form all relationships".

At Block 420 the topology tuner agent 20 obtains, such as from the directory service 50, a list of agents 40 to make the recommendation to. This could be the entire population of agents 40, or a subset of the population for which a sub-graph topology is to be tuned. Alternatively, the list of agents 40 may comprise a subset of the population selected by relationship type, if the recommendation only applies to certain types of relationship.

Next the topology tuner agent 20 enters a loop to contact the agents on the list. If at Block 430 it finds that the list is empty, the topology tuner agent 20 exits the loop and this instance of the tuning process is complete (Block 470). Otherwise, the topology tuner agent 20 selects (and removes) an agent 40 from the list (Block 440). At Block 450 the topology tuner agent 20 may tailor its recommendation to the selected agent. For example, it may be the case that the selected agent must receive the recommendation in a different form than that of the general recommendation, it being assumed that this type of information may have been obtained along with the agent's directory entry. Another example concerns the case where the recommendation involves only certain types of relationship, and the selected agent is known not to be capable of forming relationships of that type. In this case the topology tuner agent 20 need not send the recommendation at all. At Block 460 the topology tuner agent 20 sends the customized recommendation and proceeds to select another agent 40 from the list.

It should be noted that the topology tuner agent 20 may measure or estimate the topology and/or distance from the desired topology characteristics at interim points while tuning, and thus may terminate the method early. In this case there would be another decision block in the loop, and an alternative exit to Block 470.

In general, there are various forms that the recommendations made by the topology tuner agent 20 can take. For example, the recommendations can include: (a) "re-form your relationships", optionally with a relationship category; (b) "select an agent from a provided list", optionally with a relationship category; and (c) "select an agent not on a provided list", optionally with a relationship category. In this latter case, it can be appreciated that if the list includes one or more agents that the agent 40 currently has a relationship with, then the execution of this latter recommendation can have the effect of causing the agent 40 to break its relationship with one or more other agents 40 that are found on the list, and to form new relationships with other agents.

Depending on the particular situation, the topology tuner agent 20 can tune the network of agent 40 relationships for a number of different purposes. Some non-limiting examples are now presented.

The topology tuner agent 20 can tune the network of agent 40 relationships to enhance security against a future targeted attack (i.e., an attack that includes the choice of a target). It does this by requesting all or some of the agents 40 to re-form their relationships, without constraining the set of potential partners. The result is a shift toward a random-graph topology.

The topology tuner agent 20 can tune the network of agent 40 relationships to enhance robustness against random failure. It does this by requesting all or some of the agents 40 to re-form their relationships, giving preferential treatment to agents 40 in a selected list. The list is generated, and modified as the topology tuner agent 20 performs its assigned task, such that the resulting topology is or approaches that of a scale-free network.

The topology tuner agent 20 can tune the network of agent 40 relationships to provide protection against an attack on known or suspected target agent(s). It does this by requesting all or some of the agents 40 to re-form their relationships, and selecting partner agents that are not on a list of at-risk agents. The result is a network in which at-risk agents have few relationships, while the remainder of the agents 40 tend toward a random-graph topology.

The topology tuner agent 20 can tune the network of agent 40 relationships to provide protection against a possible failure of known agents. In a manner similar to the foregoing case, it does this by requesting all or some of the agents 40 to re-form their relationships, and selects partner agents that are not on a list of agents that are at-risk for failure. The result is a network in which at-risk for failure agents have few relationships, while the remainder of the agents 40 tend toward the random-graph topology.

The topology tuner agent 20 can tune the network of agent 40 relationships to provide for a reduction of "churn" or oscillations in system 10 topology, by reducing the rate of relationship change. This can be accomplished by selecting a subset of agents 40 (or all of the agents 40), and requesting those agents 40 in the selected subset to not re-form their relationships with other agents 40 for some specified period of time.

The topology tuner agent 20 can tune the network of agent 40 relationships to provide increasing system dynamism and responsiveness by increasing the rate of relationship change. This can be accomplished by selecting a subset of agents 40 (or all of the agents 40), and requesting those agents 40 in the selected subset to re-form their relationships with other agents 40. Depending on the frequency of the request, the agents 40 in the selected sub-set will tend to re-form their relationships with other agents at a rate that exceeds the rate of relationship reformation of the general population of the agents 40.

As was shown in FIG. 2, once the topology tuner agent 20 has completed a single step (or cycle) of tuning, it determines whether and when to start another cycle (Block 240). FIG. 5 shows a preferred method of making the re-tuning determination, which includes the consideration that the topology of the system 10 may change (or "drift") on its own, independent of any action performed by the topology tuner agent 20. FIG. 5 thus subsumes the Blocks 240 and 250 of FIG. 2.

From the start state (Block 500), the topology tuner agent 20 first determines at Block 510 whether the topology information it has previously gathered is still sufficiently close to the desired topology. One simple technique to make this determination involves comparing a measured statistic, such as the distribution of number of relationships, with a goal statistic. The goal statistic may have been obtained in Block 220 of FIG. 2 when the topology tuner agent 20 determined what type of tuning was to be done. It should be noted that the goal may have changed since the last tuning cycle.

If the measured topology does differ from the goal, then control transfers to Block 570 where the topology tuner agent 20 begins a new tuning cycle, also shown as the transition from Block 240 to Block 220 in FIG. 2.

If the measured topology is still sufficiently close to the desired topology, the topology tuner agent 20 estimates whether the actual system 10 may have drifted sufficiently far from the desired topology in the time since the last measurement (Block 520). The actual method whereby the topology tuner agent 20 estimates the drift in the system 10 topology can be any suitable method, and can incorporate any standard technique for time-series estimation, such as linear forecasting.

If the estimated drift exceeds an acceptable threshold limit, the topology tuner agent 20 begins another tuning cycle by transferring to Block 540, otherwise the topology tuner agent 20 waits at Block 530 for some period of time. Note that, like the desired topology, the acceptable threshold limit may have changed since the last comparison. For example, the system administrator may adjust the threshold to reflect changing high-level goals, or the topology tuner agent may calculate the threshold dynamically. Thus, the threshold that determines when to begin a new topology tuning cycle may be a variable threshold. The period of time may follow a predetermined schedule, or it may be dependent on the estimated drift rate, or it may be dependent on some other parameter or parameters (such as a historical drift rate under some certain set of system 10 conditions). The waiting period at Block 530 may be interrupted if the topology tuner agent 20 receives a new topology goal, or if it receives an express notification that the topology has changed.

At Block 540 the topology tuner agent 20 updates its measured topology information, which corresponds to Block 250 of FIG. 2. The topology tuner agent 20 preferably updates the measured topology information using the same method that it used to gather topology information in the first instance, for example, according to the method of FIG. 3. However, updating the topology information may differ from the initial information gathering process. For example, the topology tuner agent 20 may keep track of how frequently different ones of the agents 40 change their relationships (e.g., it may monitor an agent "fickleness" parameter), and may choose to re-measure the more fickle agents more frequently.

Following re-measurement of the system 10 topology, at Block 550 the topology tuner agent 20 updates its model of the system drift, e.g., by adjusting the estimated linear drift rate, and then returns to Block 510.

It should thus be appreciated that the decision as to when to begin another tuning cycle (FIG. 2, Block 240, and FIG. 5) can be accomplished by continually updating the topology information, re-calculating statistics, and then initiating another tuning cycle when a statistic or statistics reaches a threshold, or it could be accomplished continuously.

Based on the foregoing description of the presently preferred embodiments of this invention, it should be appreciated that an aspect of this invention is to execute, in the multi-agent system 10, the functionality inherent in the topology tuner agent 20. The topology tuner agent 20 gathers statistical information about the relationship-network's topology (such as the degree-distribution of nodes), and then makes recommendations to individual ones of the agents 40 to modify their relationships (if needed).

The topology tuner agent 20 is preferably endowed with special privileges, giving it sufficient nominal authority to make its recommendations to the other agents 40 effective, but otherwise preferably behaves as a "peer" agent. For example, the topology tuner agent 20 preferably uses the same messaging infrastructure as all other agents 40.

An aspect of this invention is the operation of the topology tuner agent 20 in gathering information about the network topology of the system 10, as was described above in relation to Block 210 of FIG. 2 and the method illustrated more specifically in FIG. 3. To summarize, the topology tuner agent 20 first fetches, preferably from the public directory service(s) 50 and/or 30, the list of agents 40 in the system 10, or a sub-set of them. If the relationship information is not inherently provided with the list of agents, then for each agent 40 in the list the topology tuner agent 20 may send a query about that agent's current relationships. As one example, the query may take the form: "tell me who you purchase supplies from". The query would preferably request information regarding only long-term or recurring relationships. By asking the agents 40 for their relationships in turn the topology tuner agent 20 gradually assembles a graph of the relationships amongst the agents 40. The graph, which may resemble the one shown in FIG. 1, need not be perfectly accurate, as at least some relationships may typically change while the graph is being assembled, however it is sufficient for use in making approximate statistical inferences, such as determining the degree-distribution and other agent 40 relatedness information.

As was noted above, it is also within the scope of this invention to classify relationships between agents 40 according to some classification scheme (e.g., "relationships concerning storage services" versus "relationships concerning bandwidth services"), thereby identifying different kinds of links between topological network nodes (i.e., between agents 40). To perform this function the topology tuner agent 20 need not be endowed with any "understanding" of the meaning of the various relationship categories, but only with the ability to identify to which category a given link belongs. As such, the category determination may be based simply on keyword matching.

Once the network topology graph is constructed, the topology tuner agent 20 identifies those agents 40 (i.e., network nodes) with an undesirable property or properties. For example, to make the network more robust against attack, the topology tuner agent 20 locates the nodes with the greatest number of links (of one or more categories) with other nodes. It then finds those "neighbor" agents (i.e., the agents linked to the agent that has been identified), and recommends to one or more of those agents that they link to a different node (i.e., that they link to a different one of the agents 40).

This recommendation may take several forms, from expressly identifying a particular one of the agents 40 to link to, to identifying a set of preferred agents 40 to link to, or to simply requesting that the agent break the existing link and select any other agent to link to according to its own preferences.

In a preferred embodiment of this invention the topology tuner agent 20 also requests that each neighbor agent return, to the topology tuner agent 20, a ranked list of alternate agents that the neighbor agent would find acceptable. Using this returned list, the topology tuner agent 20 is enabled to select one or more other agents that a particular agent 40 would find preferable. However, the topology tuner agent 20 is not obligated to offer a particular agent 40 one of its preferred agents to form a relationship with, as the topology tuner agent 20 may have knowledge that the preferred agent 40 is actually one that is a probable target for an attack, or a probable candidate for a failure.

An aspect of this invention involves a consideration of, and a compensation for, system 10 dynamics. During the time that the topology tuner agent 20 is gathering information and making recommendations, the agents 40 in the system 10 are carrying out their assigned tasks. This implies that the network of relationships is most likely continually changing, independent of the activities of the topology tuner agent 20. It is thus preferred that the topology tuner agent 20 incorporate the dynamics of the system 10 into its internal model.

This can be accomplished in several ways. For example, and as was discussed above in reference to FIGS. 2 and 5, the topology tuner agent 20 may revisit the agents 40 from time to time in order to update the acquired information about the network of relationships. The topology tuner agent 20 can use the updated information to measure the extent to which the statistical properties of the network topology have changed since the last update, and therefore arrive at an estimated overall rate of change in the statistics. This rate of change can then be used to determine a minimum or an optimal frequency at which the topology tuner agent 20 should revisit the agents 40 in the system 10 to determine their current relationships, and consequently the frequency at which it must issue or reissue recommendations to the agents 40 in the system 10.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims.

As but some examples of modifications and adaptions that may occur to those skilled in the art, it should be noted that the topology tuning function need not be implemented as the software agent 20, but could, instead, be implemented as a part of the hosting environment, such as by an entity that resides in the hosting environment.

Also, the foregoing description of the topology tuner agent 20 has assumed that there is no centralized control of the system 10, and possibly no centrally stored information that is descriptive of the topological properties of the agent 40 relationships. However, the topology tuner agent 20 may also be of use in situations where there is some degree of centralized control and/or centrally stored information.

For example, it may be the case that all of the agents 40 in a multi-agent system 10 have been programmed to follow a common set of policies. Typically in such situations, these policies specify a core set of common behaviors to which the agents 40 must conform, but do not fully specify the behavior of each individual one of the agents 40. In this case the agents 40 can obtain updates to the common set of policies from time to time, and change their behavior accordingly. In such a situation the recommendations of the topology tuner agent 20 may be incorporated into the common set of core policies and transmitted to the other agents 40 by means of a policy update, rather than by direct interaction between the topology tuner agent 20 and the agents 40 of the system 10.

The use of other similar or equivalent techniques and procedures may thus be attempted by those skilled in the art. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. In a data processing system, a method to tune a degree distribution topology of connectivity relationships between a plurality of self-organizing software agents, comprising:
 establishing a topology of agent degree distribution connectivity relationships for each of a plurality of system topology criterions;
 obtaining information including inter-agent degree distribution connectivity relationship of each of said plurality of agents relative to all the other of said plurality of agents in a manner that is descriptive of the current system degree distribution connectivity topology, and information of the current system degree distribution connectivity topology as compared to at least one of said plurality of established system topology criterions; and
 based at least in part on the obtained information making at least one recommendation to at least one of the plurality of agents of change of its inter-agent degree connectivity relationships to more closely match the topology of a selected one of the plurality of established topology criterions.

2. A method as in claim 1, where the step of obtaining information is performed by a topology tuner agent by querying a system registry to determine identities of individual ones of the plurality of agents.

3. A method as in claim 1, where the step of obtaining information is performed by a topology tuner agent by querying individual ones of the plurality of agents to determine to which other agent or agents the individual one of the plurality of agents currently has a connectivity relationship.

4. A method as in claim 1, where the step of obtaining information is performed by a topology tuner agent by querying a system registry to determine to which other agent or agents that individual ones of the plurality of agents currently have a connectivity relationship.

5. A method as in claim 1, where the step of obtaining information is performed on a periodic basis by a topology tuner agent to update the state of the topology, and where the topology tuner agent makes the at least one recommendation when a topology threshold condition of the current system degree distribution connectivity topology has drifted from a threshold condition of the topology corresponding to one of the plurality of established criterions has occurred.

6. A method as in claim 1, wherein at least one established criterion comprises a vulnerability of the topology to an attack directed to one or more of the agents and another established criterion comprises a vulnerability of the topology to a failure of one or more of the agents.

7. A method as in claim 1, where at least one established criterion comprises a rate at which agents form new connectivity relationships.

8. A method as in claim 1, where at least one established criterion comprises a vulnerability of the topology to an attack directed to one or more of the agents, and where the at least one recommendation does not constrain the set of potential agents that an agent may select from to form a new connectivity relationship or relationships such that the topology evolves towards a Gaussian type distribution.

9. A method as in claim 1, where at least one established criterion comprises a vulnerability of the topology to an attack directed to one or more of the agents, and where the at least one recommendation constrains the set of potential agents that an agent may select from to form a new connectivity relationship or relationships such that at-risk agents have few relationships, and such that the topology that contains the not at-risk agents evolves towards a Gaussian type distribution.

10. A method as in claim 1, where at least one established criterion comprises a vulnerability of the topology to a failure of one or more of the agents, and where the at least one recommendation constrains the set of potential agents that an agent may select from to form a new connectivity relationship or relationship such that the topology evolves towards a scale-free network.

11. A method as in claim 1, where obtaining information comprises monitoring the drift or re-self-organization of the topology over time, and where the at least one recommendation is made to compensate for the drift.

12. A method as in claim 1, where obtaining information and making at least one recommendation are performed by a topology tuner agent that is recognized by the plurality of agents to have privileges giving it sufficient nominal authority to make its recommendations to the other agents effective.

13. A method as in claim 12, where said topology tuner agent behaves otherwise as a peer agent that uses the same system messaging infrastructure as the other agents.

14. A method as in claim 1, where making at least one recommendation is performed by a topology tuner agent using a multi-cast technique to simultaneously contact a number of the agents.

15. A method as in claim 1, where making at least one recommendation is performed by a topology tuner agent using a single-cast technique to individually contact the agents.

16. A method as in claim 1, where obtaining gathers information concerning all connectivity relationships, and where the at least one recommendation applies to all types of connectivity relationships between agents.

17. A method as in claim 1, where obtaining information gathers information concerning connectivity relationships of a certain type or types, and where the at least one recommendation applies only to the certain type or types of connectivity relationships between agents.

18. A method as in claim 1, where obtaining information and making at least one recommendation are performed in response to a notification of a change in the topology.

19. A method as in claim 1, where obtaining information and making at least one recommendation are performed by a topology tuner agent that monitors how frequently individual ones of the agents change their connectivity relationships, said topology tuner agent querying those agents more frequently that more frequently change their connectivity relationships.

20. A method as in claim 1, where obtaining information and making at least one recommendation are performed by an entity in an environment that hosts the plurality of agents.

21. A method as in claim 1, where the plurality of agents operate with a common set of system policies that are capable of being changed by a policy update procedure, and where making at least one recommendation is performed during a policy update procedure.

22. A method as in claim 1 wherein the step of obtaining information comprises determining to which one of the plurality of established criterions that the current system topology most closely corresponds.

23. A method as in claim 22 wherein the step of obtaining the current information comprises forming a histogram of the connectivity relationships of the plurality of agents.

24. A method as in claim 22 wherein the information is obtained and compared to at least one of the plurality of established criterions.

25. A method as in claim 22 wherein an established criterion comprises a vulnerability of the topology to an attack directed to one or more of the agents and another established criterion comprises a vulnerability of the topology to a failure of one or more of the agents.

26. A method as in claim 25 wherein the established criterion of vulnerability of the topology to attack evolves toward a Gaussian type distribution and the established criterion of vulnerability of failure evolves toward a scale free distribution.

27. A computer readable medium storing a topology tuner software agent operable in a data processing system to tune a degree distribution topology of connectivity relationships between a plurality of self-organizing software agents, comprising:
   computer program code for establishing a topology of agent degree distribution connectivity relationships for each of a plurality of system topology criterions;
   computer program code for obtaining information that is descriptive of the current topology of the degree distribution relationships between each of said plurality of agents relative to all of the other of said plurality of self-organizing software agents from at least one of a system registry function and from the self-organizing software agents themselves;
   computer code for obtaining information from a comparison of the obtained current degree distribution connectivity topology relative to the topology corresponding to at least one of said established system criterions; and
   computer program code, responsive to the obtained information for making at least one recommendation of change of inter-agent connectivity relationship to those of the plurality of self-organizing software agents that have to modify their inter-agent connectivity relationships to achieve a new system topology that is closer to the topology corresponding to a selected one of the plurality of established criterions.

28. The computer readable medium storing the topology tuner software agent as in claim 27, where obtaining information is performed periodically by said topology tuner agent to update the state of the topology, and where the topology tuner software agent makes the at least one recommendation in response to a topology threshold condition being satisfied.

29. The computer readable medium storing the topology tuner software agent as in claim 28, where said topology threshold condition is expressed as a variable threshold value.

30. The computer readable medium storing the topology tuner software agent as in claim 27, where an established criterion comprises a vulnerability of the topology to an attack directed to one or more of the self-organizing software agents.

31. The computer readable medium storing the topology tuner software agent as in claim 27, where an established criterion comprises a vulnerability of the topology to a failure of one or more of the self-organizing software agents.

32. The computer readable medium storing the topology tuner software agent as in claim 27, where an established criterion comprises a rate at which the self-organizing software agents form new relationships.

33. The computer readable medium storing the topology tuner software agent as in claim 27, where an established criterion comprises a vulnerability of the topology to an attack directed to one or more of the self-organizing software agents, and where the at least one recommendation does not constrain the set of potential self-organizing software agents that a self-organizing software agent may select from to form a new connectivity relationship or relationships such that the topology evolves towards a Gaussian type distribution.

34. The computer readable medium storing the topology tuner software agent as in claim 27, where an established criterion comprises a vulnerability of the topology to an attack directed to one or more of the self-organizing software agents, and where the at least one recommendation constrains the set of potential self-organizing software agents that a self-organizing software agent may select from to form a new connectivity relationship or relationships such that at-risk agents have few connectivity relationships, and such that the topology that contains the not at-risk agents evolves towards a Gaussian type distribution.

35. The computer readable medium storing the topology tuner software agent as in claim 27, where an established criterion comprises a vulnerability of the topology to a failure of one or more of the self-organizing software agents, and where the at least one recommendation constrains the set of potential self-organizing software agents that a self-organizing software agent may select from to form a new connectivity relationship or relationship such that the topology evolves towards a scale-free network.

36. The computer readable medium storing the topology tuner software agent as in claim 27, where said computer program code for obtaining information comprises computer program code for monitoring the drift or re-self-organization of the topology over time, and where the at least one recommendation is made to compensate for the drift.

37. The computer readable medium storing the topology tuner software agent as in claim 27, where said topology tuner software agent is recognized by the plurality of self-organizing software agents to have privileges giving it sufficient nominal authority to make its recommendations to the self-organizing software agents effective.

38. The computer readable medium storing the topology tuner software agent as in claim 37, where said topology tuner software agent behaves otherwise as a peer agent that uses the same system messaging infrastructure as the self-organizing software agents.

39. The computer readable medium storing the topology tuner software agent as in claim 27, where making at least one recommendation is performed using a multi-cast technique to simultaneously contact a number of the self-organizing software agents, or using a single-cast technique to individually contact the self-organizing software agents.

40. The computer readable medium storing the topology tuner software agent as in claim 27, where said computer program code for obtaining information gathers information concerning all connectivity relationships, and where the at least one recommendation applies to all types of connectivity relationships between self-organizing software agents.

41. The computer readable medium storing the topology tuner software agent as in claim 27, where said computer program code for obtaining information gathers information concerning relationships of a certain type or types, and where the at least one recommendation applies only to the certain type or types of connectivity relationships between self-organizing software agents.

42. The computer readable medium storing the topology tuner software agent as in claim 27, where said computer program code for obtaining information and making at least one recommendation operate in response to a notification of a change in the topology.

43. The computer readable medium storing the topology tuner software agent as in claim 27, where said topology tuner software agent that monitors how frequently individual ones of the self-organizing software agents change their connectivity relationships, and queries those self-organizing software agents more frequently that more frequently change their connectivity relationships.

44. The computer readable medium storing the topology tuner software agent as in claim 27, where the plurality of self-organizing software agents operate with a common set of system policies that are capable of being changed by a policy update procedure, and where said computer program code for making at least one recommendation operates through a policy update procedure.

45. A data processing system comprising:
a plurality of nodes, each comprising a computer readable medium storing a self-organizing software agent configurable for autonomously establishing connectivity relationships between themselves to achieve a topology of agent degree distribution connectivity, where the totality of the relationships can be represented by a topological structure of the nodes and links between the nodes that comprise the established connectivity relationships;
where at least one of the software agents operates to establish a topology of agent degree distribution connectivity relationships for each one of a plurality of different criterions;
and the at least one of the software agents further comprises a topology tuning function that obtains information that is descriptive of the current system topology of the degree distribution connectivity relationships existing between each of the plurality of agents relative to each of the other of the plurality of agents and information of the current system topology as compared to the topology of at least one of the established different criterions and, based at least in part on the obtained information and on the data of the topology comparison, makes a recommendation to those of the plurality of software agents that would have to modify their inter-agent connectivity relationships to obtain a new system degree distribution connectivity topology to more closely match the topology of a selected one of the plurality of established criterions.

46. A data processing system as in claim 45, where the said at least one of the software agents comprises a topology tuner software agent.

47. A data processing system as in claim 45, where an established criterion comprises a rate at which software agents form new connectivity relationships.

48. A data processing system as in claim 45, where an established criterion comprises a vulnerability of the topology to an attack directed to one or more of the software agents, and where the at least one recommendation in one case does not constrain the set of potential software agents that a software agent may select from to form a new connectivity relationship or relationships such that the topology evolves towards a Gaussian type distribution, and where the at least one recommendation in another case does constrain the set of potential software agents that a software agent may select from to form a new connectivity relationship or relationships such that at-risk software agents have few connectivity relationships, and such that a portion of the topology that contains not at-risk software agents evolves towards a Gaussian type distribution.

49. A data processing system as in claim 45, where an established criterion comprises a vulnerability of the topology to a failure of one or more of the software agents, and where the at least one recommendation constrains the set of potential software agents that a software agent may select from to form a new connectivity relationship or relationship such that the topology evolves towards a scale-free network.

\* \* \* \* \*